United States Patent [19]

Kobayashi

[11] Patent Number: 5,867,482
[45] Date of Patent: Feb. 2, 1999

[54] TRAFFIC CONTROL METHOD AND SYSTEM FOR ATM SWITCHING APPARATUS

[75] Inventor: Akira Kobayashi, Tokyo, Japan

[73] Assignee: NEC Corporation, Tokyo, Japan

[21] Appl. No.: 600,208

[22] Filed: Feb. 12, 1996

[30] Foreign Application Priority Data

Feb. 17, 1995 [JP] Japan .............................. 029155/1955

[51] Int. Cl.⁶ ...................................................... H04J 3/14
[52] U.S. Cl. ........................ 370/252; 370/232; 370/235; 370/412
[58] Field of Search ..................................... 370/252, 218, 370/232, 235, 236, 231, 395, 230, 412, 415, 420

[56] References Cited

U.S. PATENT DOCUMENTS

| | | | |
|---|---|---|---|
| 5,029,164 | 7/1991 | Goldstein et al. | 370/235 |
| 5,253,247 | 10/1993 | Hirose et al. | 370/232 |
| 5,390,163 | 2/1995 | Itoh et al. | 370/218 |
| 5,519,689 | 5/1996 | Kim | 370/236 |

FOREIGN PATENT DOCUMENTS 3-218143  9/1991  Japan .............................. H04L 12/56

*Primary Examiner*—Douglas W. Olms
*Assistant Examiner*—Shick Hom
*Attorney, Agent, or Firm*—Young & Thompson

[57] ABSTRACT

In a traffic control method and system for an ATM switching apparatus, which is adapted to control traffic by restraining inflow cells on the basis of an amount of cells remaining in a queuing buffer that receives a varying amount of inflow cells and outputs a constant amount of outflow cells, a residual cell amount in the queuing buffer is monitored at intervals of unit times. The cell variation amount of cells remaining in the queuing buffer is monitored per unit time. It is determined, on the basis of the residual cell amount monitoring result and the cell variation amount monitoring result, whether a residual cell amount after the lapse of a predetermined period of time exceeds a cell residue limit amount in the queuing buffer. Inflow cells to the queuing buffer are restrained when it is determined that the residual cell amount exceeds the cell residue limit amount.

6 Claims, 6 Drawing Sheets

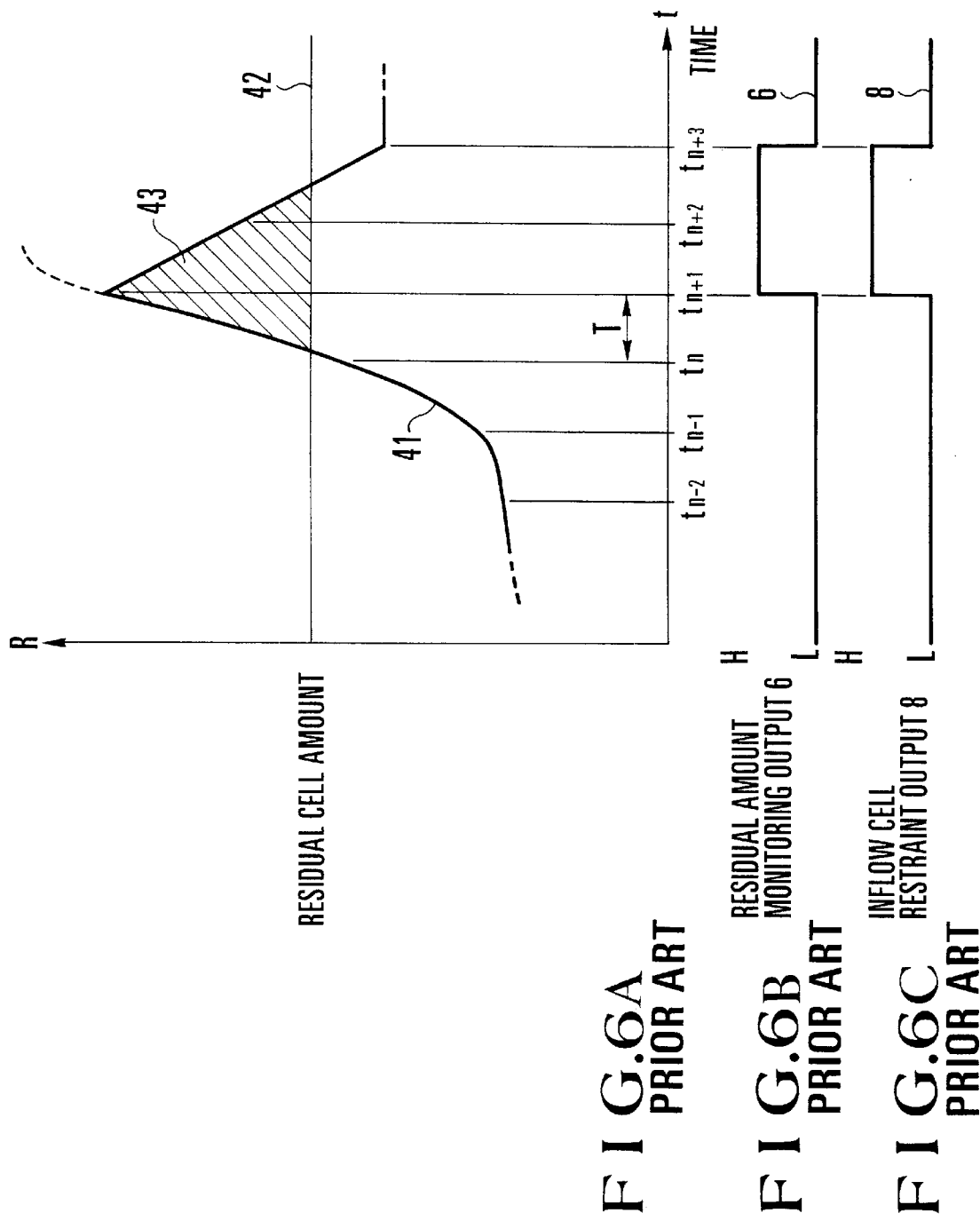

TRAFFIC CONTROL METHOD AND SYSTEM FOR ATM SWITCHING APPARATUS

BACKGROUND OF THE INVENTION

The present invention relates to a traffic control method and system for an ATM switching apparatus and, more particularly, to a traffic control method and system for an ATM switching apparatus, which control a traffic on the basis of a predetermined transmission capacity in an ATM switching apparatus for performing switching connection of fixed-length packets called cells.

In general, in an ATM switching apparatus for performing switching connection of fixed-length packets called cells on the basis of the Asynchronous Transfer Mode (ATM), the flow rate of cells, i.e., the traffic, in each virtual communication channel is monitored to control the traffic within an assigned transmission capacity.

FIG. 5 shows a conventional ATM switching apparatus traffic control system like the one disclosed in Japanese Patent Laid-Open No. 3-218143. Referring to FIG. 5, reference numeral 1 denotes a queuing buffer; 2, a cell held in the queuing buffer 1; 3, an inflow cell; 4, an outflow cell; 5, a residual amount monitoring section for monitoring the amount of cells 2 held in the queuing buffer 1, i.e., the residual amount of cells 2, on the basis of a predetermined residue threshold; 6, a residual amount monitor output from the residual amount monitoring section 5; and 7, an inflow cell restraint determining section for outputting an inflow cell restraint output 8 for designating an inflow restraint of the inflow cells 3 on the basis of the residual amount monitor output 6.

A conventional traffic control system will be described next with reference to FIGS. 6A to 6C. FIG. 6A shows the residual amount of cells in the queuing buffer 1. FIGS. 6B and 6C respectively show the residual amount monitor output 6 and the inflow cell restraint output 8. The residual amount monitoring section 5 monitors the amount of cells 2 held in the queuing buffer 1, i.e., a residual cell amount 41 (FIG. 6A) at intervals of unit times T, i.e., time $t_{n-2}$, time $t_{n-1}$, . . . Before time $t_n$ the residual cell amount 41 is below a residue threshold 42. The residual amount monitor output 6 is set at "L" level, as shown in FIG. 6B, and the inflow cell restraint output 8 from the inflow cell restraint determining section 7 is also set at "L" level, as shown in FIG. 6C. No restraint is therefore imposed on inflow cells.

Assume that the residual cell amount 41 exceeds the residue threshold 42 after time $t_n$. In this case, the residual amount monitoring section 5 recognizes this state at time $t_{n+1}$ and sets the residual amount monitor output 6 at "H" level (FIG. 6B). When the inflow cell restraint determining section 7 sets the inflow cell restraint output 8 at "H" level in response to this operation without any delay (FIG. 6C), a restraint on the inflow cells 3 to the queuing buffer 1 is started at time $t_{n+1}$. If the inflow of cells is completely stopped in performing this restraint, the residual cell amount 41 of cells 2 in the queuing buffer 1 decreases in accordance with the amount of outflow cells 4. Thereafter, the residual amount monitoring section 5 monitors at time $t_{n+3}$ that the residual cell amount 41 becomes smaller than the residue threshold 42. As a result, both the residual amount monitor output 6 and the inflow cell restraint output 8 are set at "L" level to resume the inflow of cells.

In this conventional traffic control system for an ATM switching apparatus, when the residual cell amount 41 of the queuing buffer 1 exceeds the predetermined residue threshold 42, the inflow cells 3 are restrained. The restraint on the inflow cells 3 is delayed because of the offset between the residual amount monitor timing and the traffic variation. As a result, a large amount of loss cells 43 are generated. With an increase in transmission capacity, in particular, the amount of loss cells increases.

SUMMARY OF THE INVENTION

It is an object of the present invention to provide a traffic control method and system for an ATM switching apparatus, which greatly decreases the amount of loss cells.

In order to achieve the above object, according to the present invention, there is provided a traffic control method for an ATM switching apparatus, which is adapted to control traffic by restraining an inflow cell on the basis of an amount of cells remaining in a queuing buffer that receives a varying amount of inflow cells and outputs a constant amount of outflow cells, comprising the steps of monitoring a residual cell amount in the queuing buffer at intervals of unit times, monitoring a variation in the amount of cells remaining in the queuing buffer per unit time, determining, on the basis of the residual cell amount monitoring result and the cell variation amount monitoring result, whether a residual cell amount after the lapse of a predetermined period of time exceeds a cell residue limit amount in the queuing buffer, and restraining an inflow cell to the queuing buffer when it is determined that the residual cell amount exceeds the cell residue limit amount.

BRIEF DESCRIPTION OF THE DRAWINGS

FIG. 6A is a graph showing changes in the residual amount of cells in the conventional system in FIG. 5, and FIGS. 6B and 6C are timing charts at the respective sections of the conventional system in FIG. 5.

DESCRIPTION OF THE PREFERRED EMBODIMENTS

The present invention will be described below with reference to the accompanying drawings.

Figure 1:
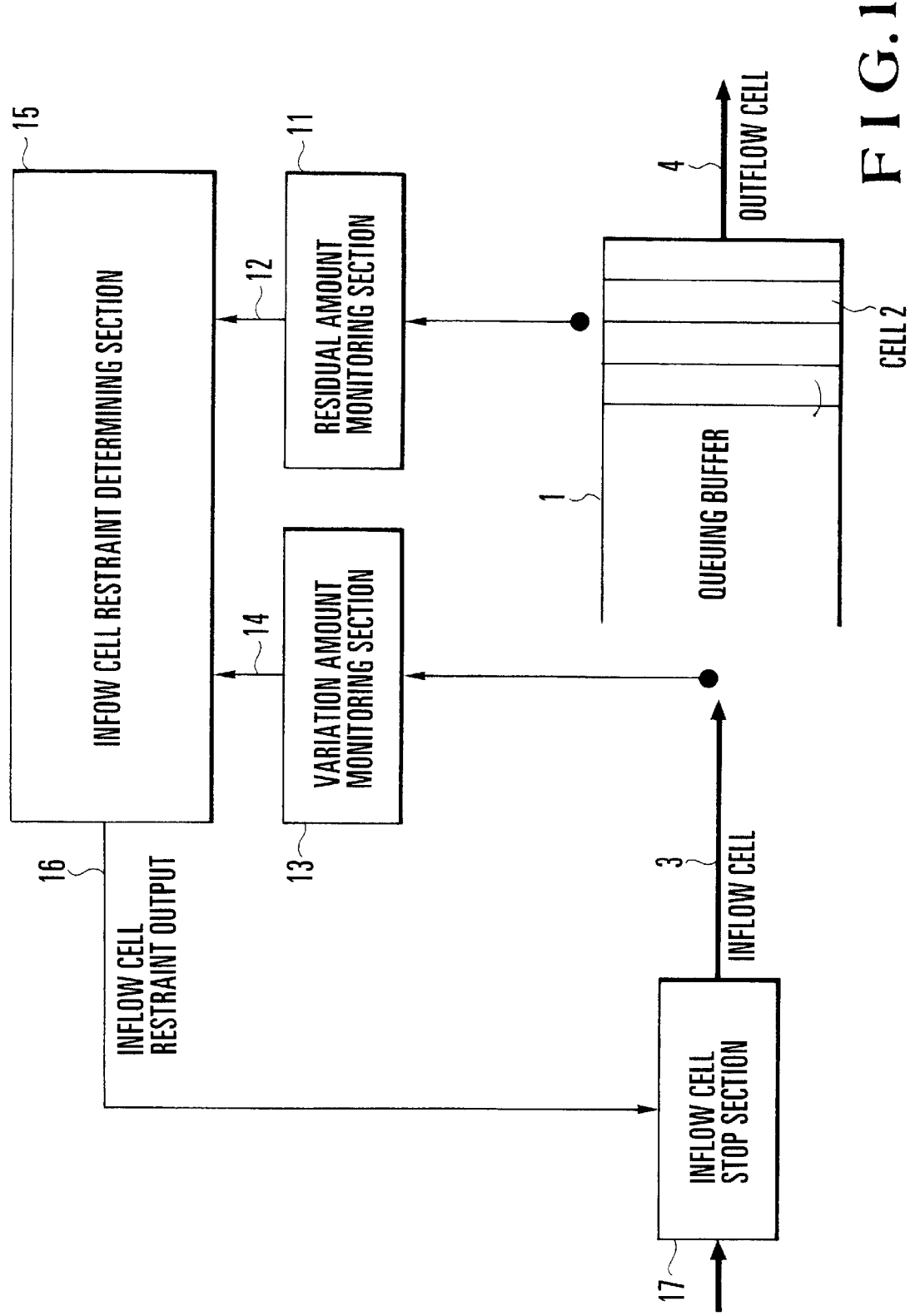
FIG. 1 is a block diagram showing the arrangement of a traffic control system for an ATM switching apparatus according to the first embodiment of the present invention.

FIG. 1 shows the arrangement of a traffic control system for an ATM switching apparatus according to the first embodiment of the present invention. Referring to FIG. 1, reference numeral 1 denotes a queuing buffer; 2, a cell temporarily held in the queuing buffer 1; 3, an inflow cell flowing into the queuing buffer 1; 4, an outflow cell flowing out of the queuing buffer 1; 11, a residual amount monitoring section for detecting and monitoring the amount of cells 2 held in the queuing buffer 1, i.e., a residual cell amount, on the basis of the difference between the amount of inflow cells 3 to the queuing buffer 1 and the amount of outflow cells 4 from the queuing buffer 1; 12, a residual amount monitor output from the residual amount monitoring section 11; 13, a variation amount monitoring section for monitoring the variation in the amount of cells 2 in the queuing buffer 1 on the basis of the amount of inflow cells 3; 14, a variation amount monitor output from the variation amount monitoring section 13; 15, an inflow cell restraint determining section for determining on the basis of the residual amount monitor output 12 and the variation amount monitor output 14 whether a restraint on the inflow cells 3 is required, and outputting an inflow cell restraint output 16 to designate a restraint on the inflow cells 3 in accordance with the determination result; and 17, an inflow cell stop section for receiving the inflow cell restraint output 16 to stop the inflow of the inflow cells 3 into the queuing buffer 1.

Figure 2A:
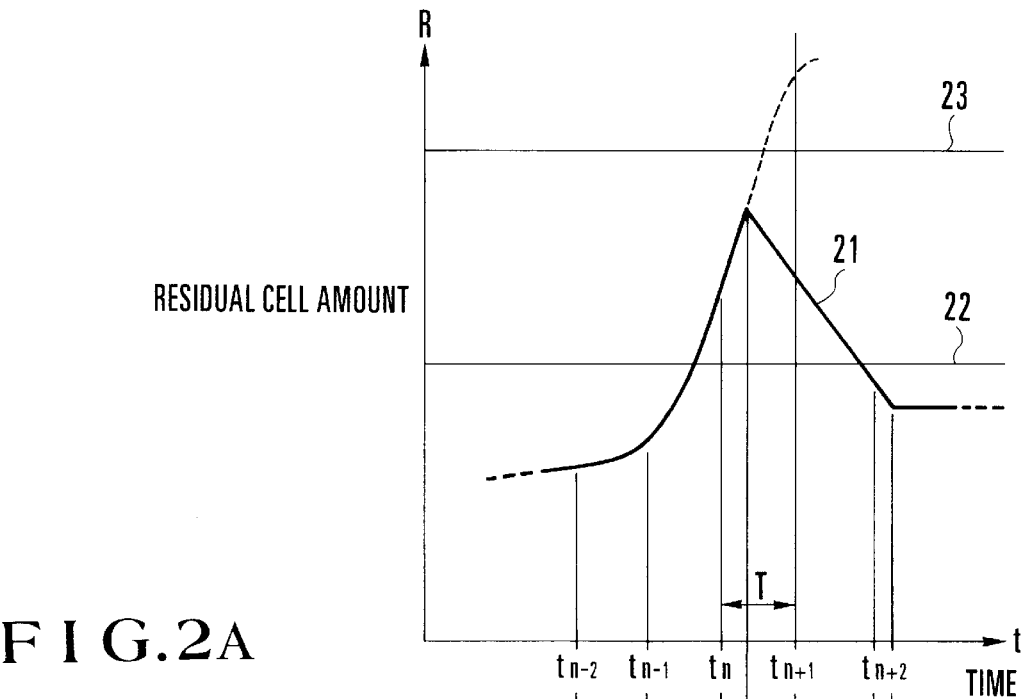
FIG. 2A is a timing chart showing changes in the residual amount of cells in a queuing buffer in FIG. 1, and FIGS. 2B to 2E are timing charts at the respective sections of the system in FIG. 1.
Figure 2B:
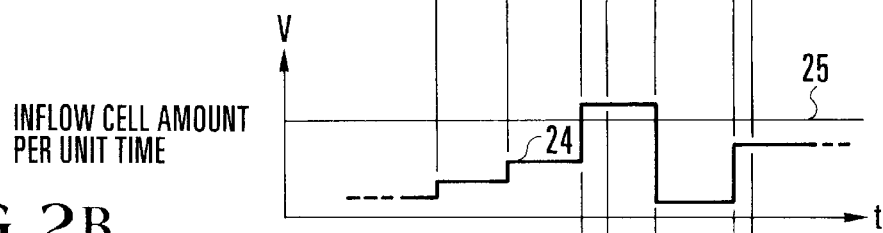
Figure 2C:
Figure 2D:
Figure 2E:

The operation of the present invention will be described next with reference to FIGS. 2A to 2E. FIG. 2A shows the residual amount of cells in the queuing buffer 1. FIG. 2B shows the amount of inflow cells to the queuing buffer 1. FIG. 2C shows the residual amount monitor output 12. FIG. 2D shows the variation amount monitor output 14. FIG. 2E shows the inflow cell restraint output 16. Note that the amount of inflow cells 3 changes, but the amount of outflow cells 4 is constant.

As shown in FIG. 2A, the residual amount monitoring section 11 detects the amount of cells 2 held in the queuing buffer 1, i.e., a residual cell amount 21, at intervals of unit times T, i.e., time $t_{n-2}$, time $t_{n-1}$, . . . , and monitors the residual cell amount 21 by comparing it with a predetermined residue threshold 22. In this case, the residual cell amount 21 is below the residue threshold 22 before time $t_{n-1}$. As shown in FIG. 2C, therefore, the residual amount monitor output 12 is at "L" level.

As shown in FIG. 2B, the variation amount monitoring section 13 detects the amount of inflow cells 3 flowing into the queuing buffer 1 at intervals of unit times T, i.e., time $t_{n-2}$, time $t_{n-1}$, to output an inflow cell amount 24 per unit time T as a cell variation amount, and compares it with a predetermined inflow threshold 25 (variation threshold), thereby monitoring the inflow cell amount 24 per unit time. The inflow cell amount 24 in the interval (unit time T) between time $t_{n-2}$ and time $t_{n-1}$ is output on the basis of the difference between the residual cell amounts 21 at time $t_{n-2}$ and time $t_{n-1}$ immediately after time $t_{n-1}$. The output value is not updated until the next output timing, i.e., time $t_n$ in this case. Before time $t_n$, the inflow cell amount 24 is below the inflow threshold 25, and hence the variation amount monitor output 14 is at "L" level, as shown in FIG. 2D.

The inflow cell restraint determining section 15 determines on the basis of the residual amount monitor output 12 and the variation amount monitor output 14 whether a restraint on the inflow cells 3 is required. Since both the monitor outputs 12 and 14 are at "L" level before time $t_n$, the inflow cell restraint determining section 15 determines that the possibility that the residual cell amount 21 exceeds the capacity of the queuing buffer 1, i.e., a cell residue limit amount 23 in FIG. 2A, until the next monitoring/determination timing, is low, and set the inflow cell restraint output 16 at "L" level, as shown in FIG. 2E.

Assume that as the amount of inflow cells 3 increases after time $t_{n-1}$, the residual cell amount 21 begins to increase and exceeds the residue threshold 22 immediately before time $t_n$. In this case, the residual amount monitoring section 11 detects this state at time $t_n$, and sets the residual amount monitoring output 12 in FIG. 2C at "H" level. Similarly, as shown in FIG. 2B, the variation amount monitoring section 13 outputs the inflow cell amount 24 per unit time, the interval between time $t_{n-1}$ and time $t_n$ in this case, at time $t_n$. With an increase in the amount of inflow cells 3, the inflow cell amount 24 exceeds the inflow threshold 25. As a result, the variation amount monitor output 14 in FIG. 2D is set at "H" level.

Since both the residual amount monitor output 12 and the variation amount monitor output 14 indicate that the residual cell amount 21 and the inflow cell amount 24 exceed the residue threshold 22 and the inflow threshold 25, respectively, the inflow cell restraint determining section 15 determines that the possibility that the residual cell amount 21 exceeds the cell residue limit amount 23 in the queuing buffer 1 to cause loss of the cells 2 until the next monitoring/determination timing is high. In order to designate the beginning of a restraint on the inflow cells 3 on the basis of this determination, the inflow cell restraint determining section 15 sets the inflow cell restraint output 16 at "H" level, as shown in FIG. 2E.

With this operation, the inflow of the inflow cells 3 is stopped by the inflow cell stop section 17 located on the upstream side of the queuing buffer 1. As shown in FIG. 2A, the residual cell amount 21 decreases at a rate corresponding to the constant outflow amount of outflow cells 4 after time $t_n$. Thereafter, the variation amount monitoring section 13 detects that the inflow cell amount 24 per unit time becomes smaller than the inflow threshold 25 at time $t_{n+1}$ after the inflow of the inflow cells 3 is stopped, and sets the variation amount monitor output 14 in FIG. 2D at "L" level. The residual amount monitoring section 11 also detects that the residual cell amount 21 becomes smaller than the residue threshold 22 at time $t_{n+2}$, and sets the residual amount monitor output 12 in FIG. 2C at "L" level.

Since both the residual amount monitor output 12 and the variation amount monitor output 14 indicate that the residual cell amount 21 and the inflow cell amount 24 respectively become smaller than the residue threshold 22 and the inflow threshold 25, the inflow cell restraint determining section 15 determines, in accordance with this output 12, that the possibility that the residual cell amount 21 exceeds the cell residue limit amount 23 until the next monitoring/determination timing is low. The inflow cell restraint output 16 in FIG. 2E is set at "L" level on the basis of this determination to cancel the restraint imposed on the inflow cells 3 by the inflow cell stop section 17.

As described above, the first embodiment includes the residual amount monitoring section 11 for monitoring the residual amount of cells in the queuing buffer 1 and the variation amount monitoring section 13 for monitoring a cell variation amount in the queuing buffer 1. The inflow cell restraint determining section 15 predicts an increase in residual cell amount from the residual cell amount and the cell variation amount. If there is a possibility that the residual cell amount 21 exceeds the cell residue limit amount 23, the inflow of the inflow cells 3 is restrained. This operation prevents loss cells from being generated in a large amount when a restraint on inflow cells is delayed because of an offset between the residual amount monitoring timing and the traffic variation as in the prior art. Since a need for a restraint on inflow cells can be determined at an early stage, the amount of loss cells can be greatly decreased.

According to the first embodiment, the residue threshold 22 and the inflow threshold 25 are set, and the residual cell amount 21 and the inflow cell amount 24 are respectively compared/monitored by the residual amount monitoring section 11 and variation amount monitoring section 13. The determination processing performed by the inflow cell restraint determining section 15 can therefore be simplified, and determination processing can be accurately and quickly performed with a relatively small arrangement.

In the first embodiment, the variation amount monitoring section 13 monitors a variation in the 5 residual amount of cells in the queuing buffer 1 on the basis of an inflow cell amount. However, this monitoring operation may be performed by obtaining the variation amount of the residual cell amount 21 per unit time from the residual cell amount 21 at each timing. This allows an accurate monitoring operation even if the outflow amount of outflow cells 4 varies at short intervals.

In addition, in the first embodiment, the residue threshold 22 and the inflow threshold 25 are set, and the residual cell amount 21 and the inflow cell amount 24 are respectively compared/monitored by the residual amount monitoring section 11 and the variation amount monitoring section 13. However, a residual cell amount at the next monitoring/determination timing may be predicted/calculated from an actually detected residual cell amount 21 and the variation amount of the residual cell amount 21 per unit time, and the predicted value may be compared with the cell residue limit amount 23 in the queuing buffer 1, thereby determining whether 25 a restraint on inflow cells is required.

Figure 3:
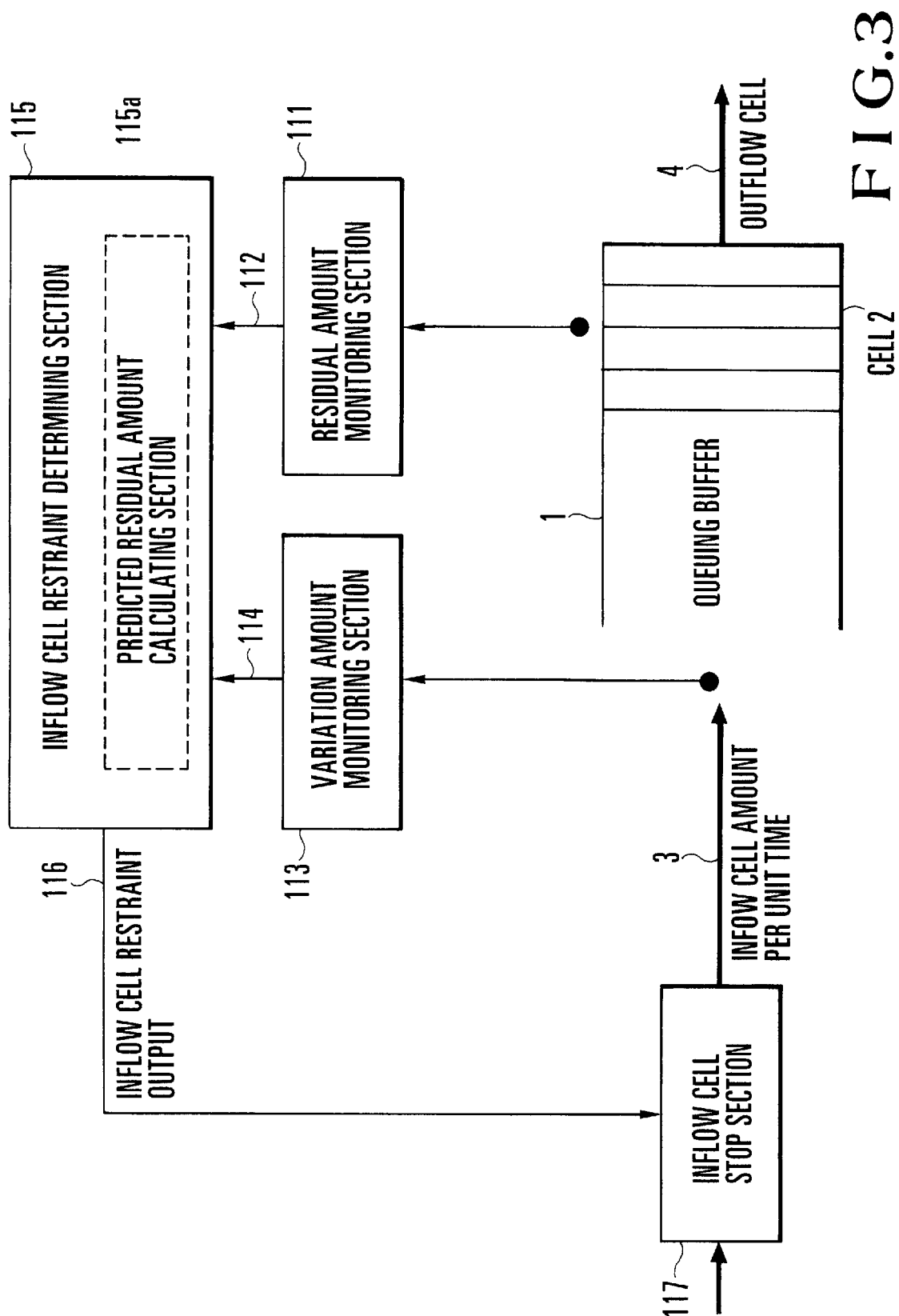
FIG. 3 is a block diagram showing the arrangement of a traffic control system for an ATM switching apparatus according to the second embodiment of the present invention.

The second embodiment in which the above predicted residual amount is calculated to determine whether to restrain inflow cells will be described next. FIG. 3 shows the arrangement of a traffic control system for an ATM switching apparatus according to the second embodiment of the present invention. Referring to FIG. 3, reference numeral 111 denotes a residual amount monitoring section for detecting and monitoring the amount of cells 2 held in a queuing buffer 1, i.e., a residual cell amount, on the basis of the difference between the amount of inflow cells 3 to the queuing buffer 1 and the amount of outflow cells 4 from the queuing buffer 1; 112, a residual amount monitor output from the residual amount monitoring section 111; 113, a variation amount monitoring section for monitoring the variation amount of cells 2 in the queuing buffer 1 on the basis of the amount of inflow cells 3; 114, a variation amount monitor output from the variation amount monitoring section 113; 115, an inflow cell restraint determining section which includes a predicted residual amount calculating section 115a for calculating the predicted residual amount of cells in the queuing buffer 1 on the basis of the residual amount monitor output 112 and the variation amount monitor output 114, determines on the basis of the predicted residual amount calculated by the predicted residual amount calculating section 115a whether a restraint on the inflow cells 3 is required, and designates a restraint on the inflow cells 3 by outputting an inflow cell restraint output 116 in accordance with the determination result; and 117, an inflow cell stop section for receiving the inflow cell restraint output 116 and stopping the inflow of the inflow cells 3 into the queuing buffer 1.

Figures 4A, 4B:
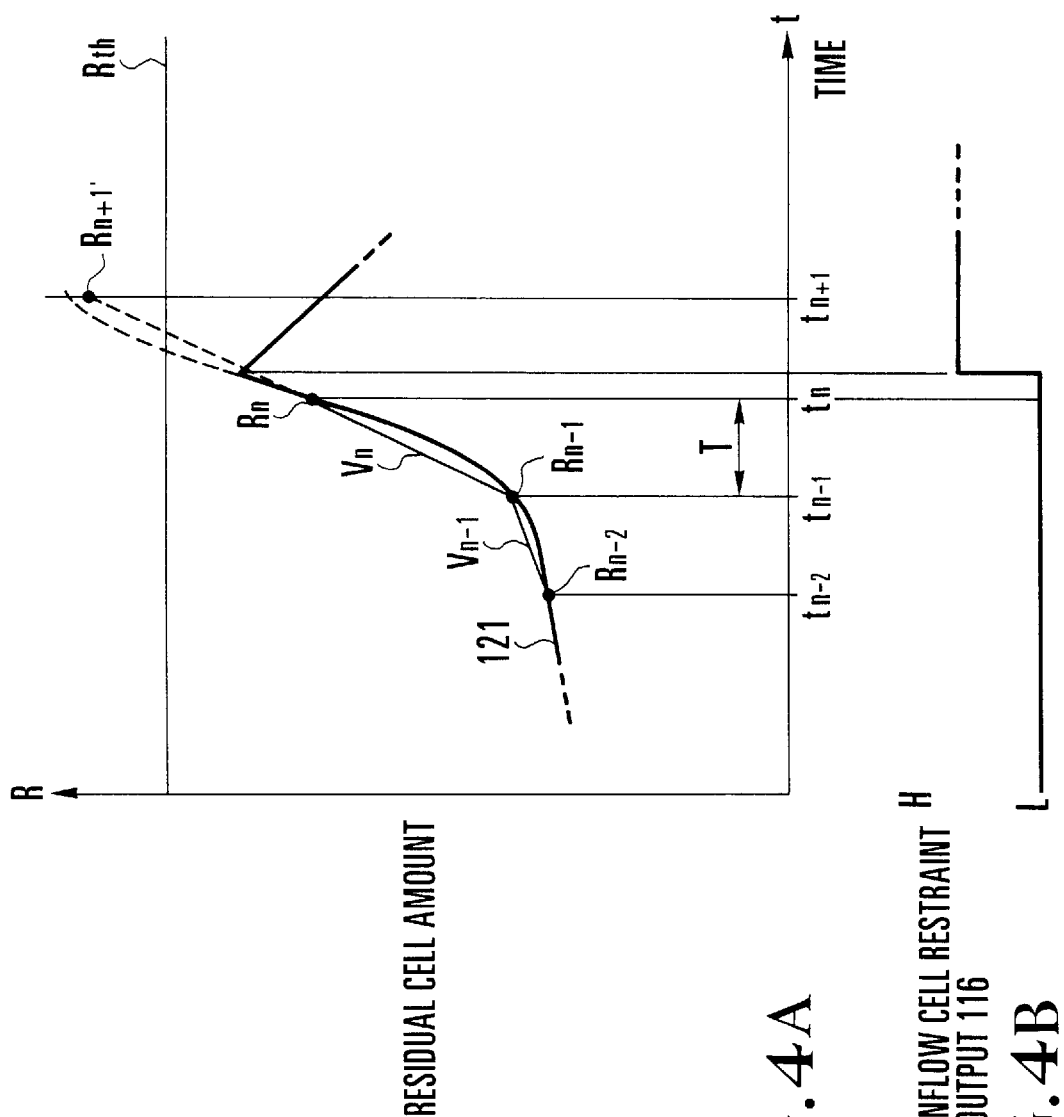
FIG. 4A is a graph for explaining a method of calculating a predicted residual amount in the system in FIG. 3.
FIG. 4B is a timing chart of the system in FIG. 3.
Figure 5:
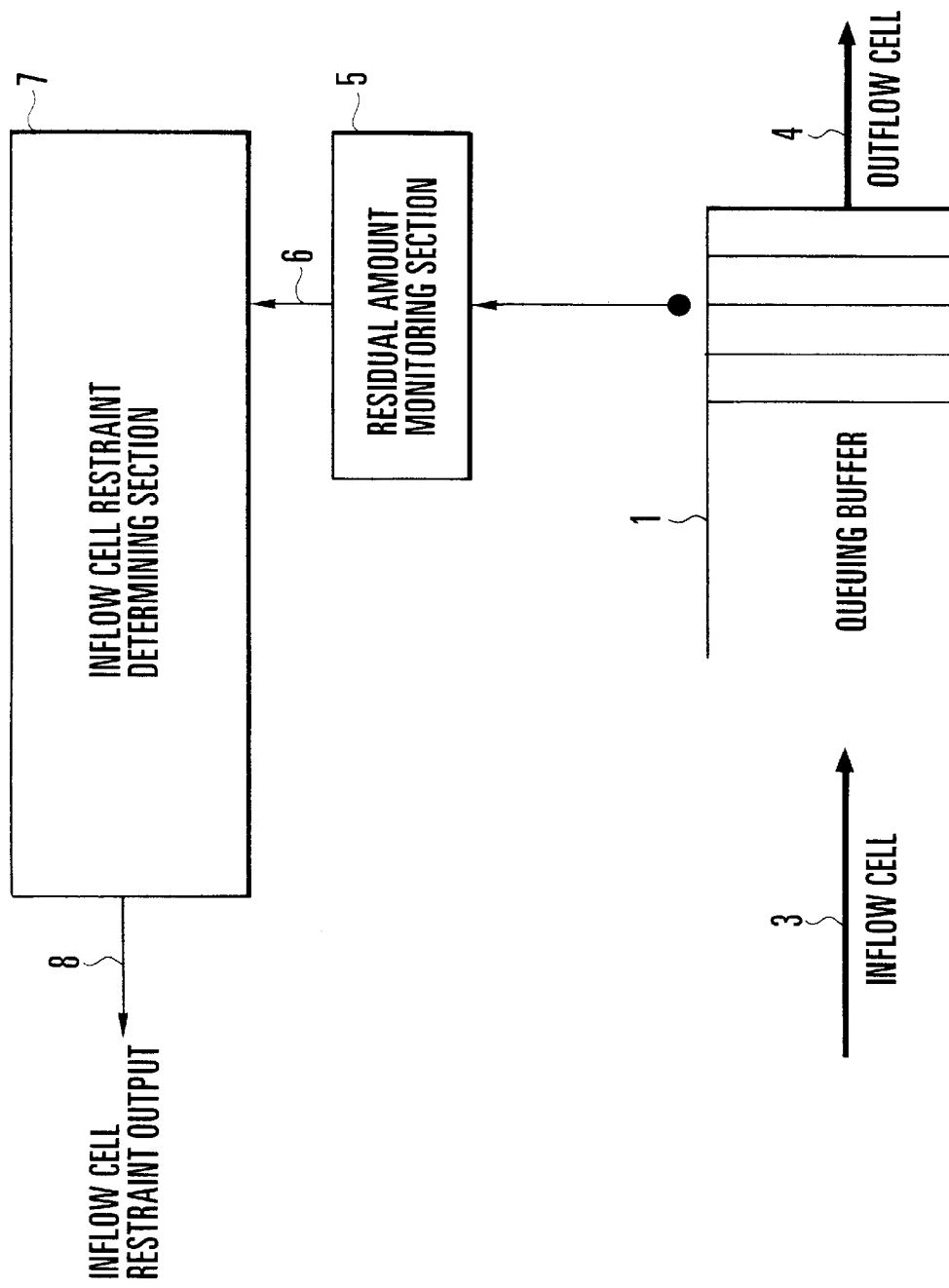
FIG. 5 is a block diagram for explaining a conventional traffic control method.

FIG. 4A explains a method of calculating a predicted residual amount. Referring to FIG. 4A, reference symbols $R_{n-2}$, $R_{n-1}$, . . . denote residual cell amounts 121 detected at time $t_{n-2}$, time $t_{n-1}$, . . . ; $R_{n+1'}$, a predicted residual amount at time $t_{n+1}$ predicted at time $t_n$; $R_{th}$, a cell residue limit amount in the queuing buffer 1; and $V_{n-1}$, $V_n$, . . . , variation amounts of the residual cell amount 121 at intervals of unit times T, i.e., time $t_{n-2}$ to time $t_{n-1}$, time $t_{n-1}$ to time $t_n$, . . .

The variation amount monitoring section 113 obtains cell variation amounts $V_n$ at intervals of unit times, i.e., time $t_{n-1}$ to time $t_n$, from the residual cell amount $R_{n-1}$ at time $t_{n-1}$ and the residual cell amount $R_n$ at time $t_n$ according to the following equation:

$$V_n = (R_{n-1} - R_n)/T \quad (1)$$

The predicted residual amount calculating section 115a calculates a predicted residual amount R' of cells at the next monitoring/determination timing from the residual cell amount R at each timing, output as the residual amount monitor output 112 from the residual amount monitoring section 111, and the cell variation amount V at each timing, output as the variation amount monitor output 114 from the variation amount monitoring section 113.

At time $t_n$, therefore, the predicted residual amount calculating section 115a calculates the predicted residual amount $R_{n+1'}$, on the basis of the residual cell amount $R_n$, and the cell variation amount $V_n$, obtained from equation (1) by using equation (2):

$$R_{n+1'} = R_n + V_n \times T \quad (2)$$

Subsequently, the inflow cell restraint determining section 115 compares the predicted residual amount $R_{n+1'}$ calculated from equation (2) with the predetermined cell residue limit amount $R_{th}$. If the restraint necessity determination criterion indicated by the following inequality:

$$R_{n+1'} > R_{th}$$

is satisfied, it is determined in consideration of the current degree of increase in cells that the possibility that the residual amount exceeds the cell residue limit amount $R_{th}$ at the next monitoring/determination timing, i.e., time $t_{n+1}$, is high. On the basis of this determination result, the inflow cell restraint output 116 is set at "H" level to designate the inflow cell stop section 117 to start restraining the inflow of the inflow cells 3, as shown in FIG. 4B.

As described above, according to the second embodiment, the residual cell amount R' at the next monitoring/determination timing is predicted/calculated from the residual cell amount V having undergone a change in the immediately preceding unit time and the current residual cell amount R. The residual cell amount R' is then compared with the cell residue limit amount $R_{th}$ to determine whether a restraint on inflow cells is required. This operation allows accurate determination of the necessity of a restraint on inflow cells. Therefore, a traffic can be efficiently controlled within a predetermined transmission capacity.

In the second embodiment, the predicted residual amount R' is calculated from the cell variation amount V per unit time. However, the predicted residual amount R' may be calculated from the amount of inflow cells per unit time and a change in the amount of outflow cells instead of the cell variation amount V. In addition, the inflow cell restraint determining section 115 includes the predicted residual amount calculating section 115a. However, the inflow cell restraint determining section 115 and the predicted residual amount calculating section 115a may be separately arranged.

As has been described above, the present invention includes the residual amount monitoring means for monitoring the residual amount of cells in the queuing buffer at intervals of unit times, and the variation amount monitoring means for monitoring the cell variation amount of cells remaining in the queuing buffer per unit time. It is determined on the basis of the residual amount monitoring result and the variation amount monitoring result whether the residual cell amount after the lapse of a predetermined period of time exceeds the cell residue limit amount in the queuing buffer. A restraint on cells flowing into the queuing buffer is designated on the basis of the determination result. This operation prevents loss cells from being generated in a large amount when a restraint on inflow cells is delayed because of an offset between the residual amount monitoring timing and the traffic variation as in the prior art, and allows determination of a restraint on inflow cells at an early stage, thereby greatly decreasing the amount of loss cells.

In addition, stoppage of inflow cells is designated when the residual cell amount exceeds a predetermined residue threshold and the cell variation amount per unit time exceeds a predetermined variation threshold. Inflow cell restraint determination processing can therefore be simplified, and accurate determination can be performed with a relatively small arrangement.

Furthermore, a predicted residual amount is calculated as a residual cell amount after the lapse of a predetermined period of time from a residual cell amount in each unit time and a cell variation amount per unit time, and the predicted residual amount is compared with a cell residue limit amount. A restraint on cells flowing into the queuing buffer is designated in accordance with the comparison result. Accurate determination of the necessity of a restraint can be therefore be performed, and a traffic can be efficiently controlled within a predetermined transmission capacity.

What is claimed is:

1. A traffic control method for an ATM switching apparatus, which is adapted to control traffic by restraining inflow remaining in a queuing buffer that receives a varying amount of inflow cells and outputs a constant amount of outflow cells, comprising the steps of:

monitoring a residual cell amount in said queuing buffer at intervals of unit times;

monitoring a cell variation amount of cells remaining in said queuing buffer per unit time;

calculating a predicted residual cell amount as the residual cell amount after a predetermined period of time by using a current value of the residual cell amount and an immediately preceding value of the cell variation amount;

determining, on the basis of the calculated predicted residual cell amount, whether the residual cell amount after the predetermined period of time exceeds a cell residue limit amount in said queuing buffer by comparing the predicted residual cell amount with the cell residue limit amount; and restraining the inflow cells to said queuing buffer when it is determined that the predicted residual cell amount exceeds the cell residue limit amount.

2. The method according to claim 1, wherein the step of monitoring the residual cell amount comprises the steps of comparing the residual cell amount with a predetermined residue threshold, and outputting the residual cell amount monitoring result when the residual cell amount exceeds the predetermined residue threshold, and wherein the step of monitoring the cell variation amount comprises the steps of comparing the cell variation amount per unit time with a predetermined variation threshold, and outputting the cell variation amount monitoring result when the cell variation amount exceeds the predetermined variation threshold.

3. A method according to claim 2, wherein the step of determining comprises the step of indicating that the residual cell amount exceeds the cell residue limit amount, when the residual cell amount monitoring result and the cell variation amount monitoring result are simultaneously output.

4. A traffic control system for an ATM switching apparatus, comprising:

a queuing buffer for receiving a varying amount of inflow cells and outputting a constant amount of outflow cells, said ATM switching apparatus controlling a traffic by restraining the inflow cells on the basis of an amount of cells remaining in said queuing buffer;

residual amount monitoring means for monitoring a residual cell amount in said queuing buffer at intervals of unit times;

variation amount monitoring means for monitoring a cell variation amount of cells remaining in said queuing buffer per unit time;

predicted residual amount calculating means for calculating a predict ed residual cell amount as the residual cell amount after a predetermined period of time by using a current residual cell amount output from said residual amount monitoring means and an immediately preceding cell variation amount output from said variation amount monitoring means;

determination means for determining, on the basis of the predicted residual cell amount monitoring result from said predicted residual cell amount calculating means, whether the residual cell amount after the predetermined period of time exceeds a cell residue limit amount in said queuing buffer from comparing the calculated predicted residual cell amount from said predicted residual amount calculating means with the cell residue limit amount; and restraining means for restraining the inflow cells to said queuing buffer when said determination means determines that the predicted residual cell amount exceeds the cell residue limit amount.

5. The system according to claim 4, wherein said residual amount monitoring means compares the residual cell amount with a predetermined residue threshold, and outputs the residual cell amount monitoring result when the residual cell amount exceeds the predetermined residue threshold, and said variation amount monitoring means compares the cell variation amount per unit time with a predetermined variation threshold, and outputs the cell variation amount monitoring result when the cell variation amount exceeds the predetermined variation threshold.

6. The system according to claim 5, wherein said determination means indicates that the residual cell amount exceeds the cell residue limit amount, when the residual cell amount monitoring result and the cell variation amount monitoring result are simultaneously output from said residual amount monitoring means and said cell variation amount monitoring means, respectively.

* * * * *